April 2, 1935.  A. HOLMSTROM  1,996,154
SHOCK ABSORBER
Filed Sept. 28, 1933   2 Sheets-Sheet 2
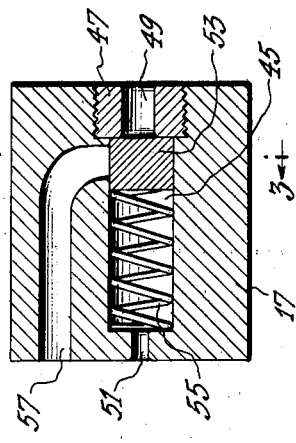
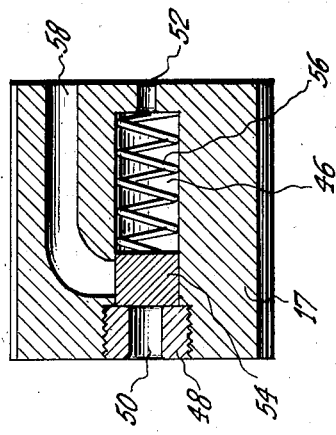
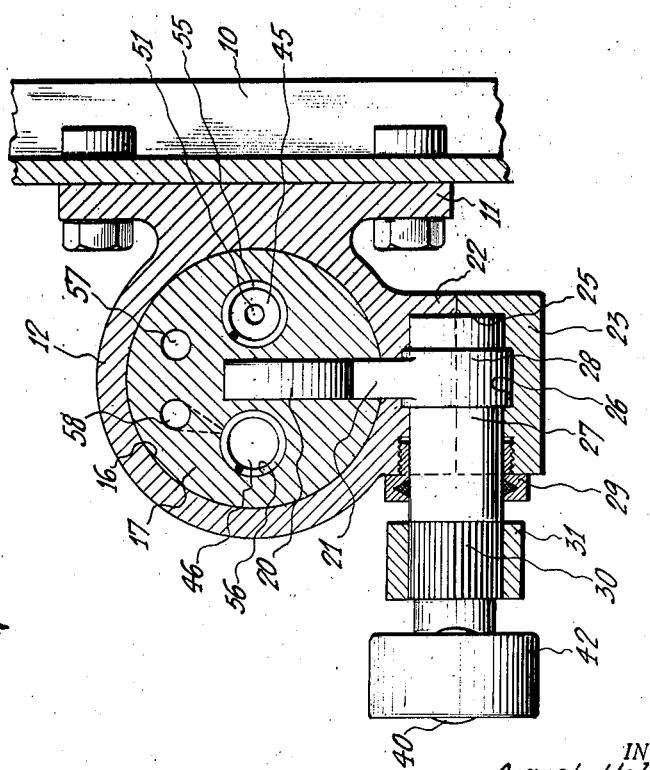
INVENTOR.
August Holmstrom.
BY
ATTORNEY Patented Apr. 2, 1935

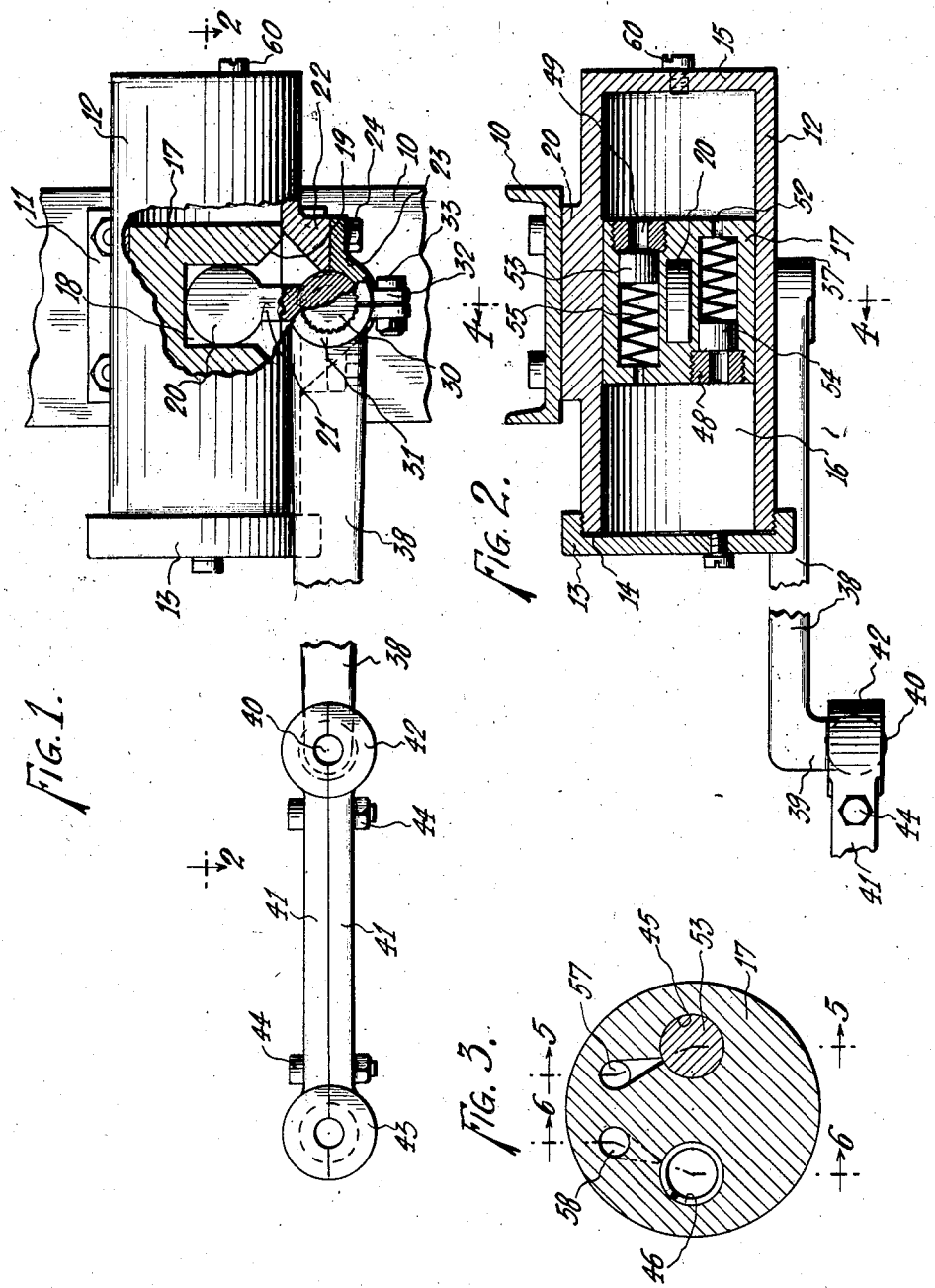

1,996,154

UNITED STATES PATENT OFFICE 1,996,154

SHOCK ABSORBER

August Holmstrom, Secaucus, N. J.

Application September 28, 1933, Serial No. 691,376

1 Claim. (Cl. 188—88)

This invention relates to shock absorbers of a yieldable type, as used for vehicle springs, and more particularly to shock absorbers of the hydraulic type having an automatically acting pressure control.

One of the objects of the invention is to provide a shock absorbing structure in which liquid is compressed by the movement of the springs, producing a cushioning effect upon both the bound and rebound of the vehicle springs.

A further feature is in the provision of a shock absorber composed of simple parts capable of long continued use and which are unobtrusive in appearance.

Another purpose is to produce a shock absorber in which the moving parts are protected from entry of dust or gritty particles which might tend to wear the moving surfaces and produce leaky conditions.

These several objects are attained by the novel construction and combination of few and simple parts as hereinafter described and shown in the accompanying drawings, forming a material part of this disclosure, and in which:—

Figure 1 is a top plan view showing an embodiment of the invention, parts being broken away to disclose its construction.

Figure 2 is a longitudinal sectional view taken on line 2—2 of Figure 1.

Figure 3 is a transverse sectional view of the piston and drawn to an enlarged scale, taken on line 3—3 of Fig. 5.

Figure 4 is a transverse sectional view taken on line 4—4 of Figure 2.

Figure 5 is a longitudinal sectional view taken on line 5—5 of Figure 3.

Figure 6 is a similar sectional view taken on line 6—6 of Figure 3.

Attached either vertically or horizontally to some part of the chassis frame, as a channel bar 10, are the flanges 11 of a casing 12, generally cylindrical, and provided at one end with screw threads to engage a cap 13 having a packing element 14, to contact the open end of the cylinder opposite its closed end 15; the casing contains a cylindrical bore 16 to which is fitted a piston 17 having a relatively narrow central recess 18, bevelled at its entering edges 19.

Fitted closely within the recess 18 is the particircular head 20 of an arm 21 projecting outwardly through an outstanding central lug 22 formed on the casing 12, and provided with a cap 23 held by bolts 24.

The lug member 22 and its cap 23 are bored inwardly from one end, as at 25, and counterbored centrally as at 26, the bore receiving a rigid stud 27 and a counterbore an enlarged shoulder portion 28 of the lever arm 21.

A packing screw 29 is fitted to the outer end of the bore 25 to provide a tight joint for the spindle, the outer end 30 of which is corrugated as clearly shown and fitted to it is a hub 31 provided with corresponding corrugations and split at one side to provide forks 32 clamped by a bolt 33 thereby providing an effective non-slip connection between the hub and spindle.

Extending from the hub 31 in a bar 38 having a right angle offset arm 39 terminating in a sphere 40 adapted to be engaged between the two halves of a connecting link 41, provided with enlarged heads 42 containing a spherical recess to receive the sphere 40 and at the other end with a similar enlarged head 43, which may also be spherical recessed for connection with the spring or other elements, the movement of which the structure is adapted to absorb, it being understood that the two portions 41 of the connecting link are held together as by the bolts 44.

Returning now to the piston 17 and by reference to Figures 3 to 6 inclusive, it will be seen that the piston 17 is provided with two bores 45—46 offset equally from the center and arranged in parallel planes, one of the passages as 45, being open at one end while the other passage 46 is open at the opposite end of the piston.

These open ends are enlarged and provided with screw caps 47—48 at the respective ends which contain central passages 49—50.

The opposite end of the openings 45—46 are similarly provided with vent openings 51—52, and freely slidable in the openings 45—46 are solid piston valves 53—54, these being forced outwardly toward the retaining screw by coiled compression springs 55—56.

The valves 53—54 are adapted to cover ports 57—58 starting near the screws 47—48 at their inner ends and being completely open at their outer ends, as clearly shown.

It will now be understood that upon movement of the connecting elements 41, motion will be produced in the lever 38 and transmitted by it to the lever terminating in the element 20, causing the piston 17 to move in one direction or the other, this movement, however, being cushioned by liquid contained in the bore of the cylinder 12 and having a compression effect, causing the liquid to enter the openings 49—50, moving the valves 53—54 and permitting the excess pressure to be released by the ports 57—58, it being understood that immediately the excess pressure has been released, the valve will close the opening and this is true of the device in whichever direction the piston may move. In addition an inlet 60, is provided in each cylinder end closed by a screw to prevent the entrance of air and dust, while the removal of the screw will allow the introduction of the hydraulic means.

The shock absorber can either be mounted vertically or horizontally on the chassis as the situation requires.

Having thus described the invention what is claimed as new and sought to secure by Letters Patent is:—

In a hydraulic shock absorber for vehicle springs, a casing adapted to be secured to the frame of the vehicle and having a longitudinally extending cylindrical bore closed at its ends, a piston operative in said bore, shock operated means to move said piston in either direction, said piston having two bores equally offset from its center and arranged in parallel planes, said piston bores being open at opposite ends of the piston, screw caps closing the open ends of said bores and containing central passages, solid piston valves freely slidable in said bores, said piston having two ports, one of said ports communicating between one of said piston bores and one side of said casing bore, the other of said ports communicating between the other of said piston ports and the other side of said casing bore, and springs for forcing said valves outwardly to permit any excess of pressure to be released by said piston ports, said valves closing the passages in said screw caps for absorbing the shocks experienced by said piston.

AUGUST HOLMSTROM.